United States Patent [19]

Klöber

[11] Patent Number: 4,953,897
[45] Date of Patent: Sep. 4, 1990

[54] VENT PIPE COUPLING

[76] Inventor: Johannes Klöber, Theodor-Storm-Strasse 4, D-5628 Ennepetal, Fed. Rep. of Germany

[21] Appl. No.: 483,272

[22] Filed: Feb. 16, 1990

Related U.S. Application Data

[63] Continuation of Ser. No. 272,503, Nov. 16, 1988, abandoned.

[30] Foreign Application Priority Data

Apr. 23, 1988 [DE] Fed. Rep. of Germany ... 8805399[U]

[51] Int. Cl.$^5$ ............................................. F16L 51/02
[52] U.S. Cl. ................... 285/226; 285/236; 285/237
[58] Field of Search ................... 285/226, 236, 42, 43, 285/235, 109, 239, 237

[56] References Cited

U.S. PATENT DOCUMENTS

| | | | |
|---|---|---|---|
| 1,442,625 | 1/1923 | Lyth | 285/226 X |
| 1,829,236 | 10/1931 | Perkins | 285/236 X |
| 2,308,073 | 1/1943 | Hagerty | 285/226 X |
| 3,043,612 | 7/1962 | Paulik et al. | 285/226 |
| 3,269,754 | 8/1966 | Bertling et al. | 285/109 |
| 3,388,705 | 6/1968 | Grosshandler . | |
| 3,511,061 | 5/1970 | Burckhardt | 285/226 X |
| 3,938,834 | 2/1976 | Oostenbrink | 285/235 |
| 3,977,137 | 8/1976 | Patry | 285/42 X |
| 4,229,028 | 10/1980 | Gray | 285/235 |
| 4,575,128 | 3/1986 | Sundquist | 285/226 X |
| 4,650,224 | 3/1987 | Smith | 285/226 X |

FOREIGN PATENT DOCUMENTS

| | | | |
|---|---|---|---|
| 2929978 | 2/1981 | Fed. Rep. of Germany . | |
| 1352919 | 1/1964 | France | 285/226 |
| 867346 | 5/1961 | United Kingdom | 285/236 |
| 1080305 | 8/1967 | United Kingdom | 285/235 |

Primary Examiner—Dave W. Arola
Attorney, Agent, or Firm—Collard, Roe & Galgano

[57] ABSTRACT

A one-piece flexible plastic coupling for connecting a first conduit with a pipe of a second conduit has a central portion in the form of a bellows. The coupling has an end in the form of a cylindrical socket for receiving, an end of the pipe of the second conduit. The cylindrical socket has an inner surface with a diameter greater than an outer diameter of the pipe of the second conduit and an outer surface having a diameter defining a socket wall of predetermined thickness. The socket includes at least one protrusion extending inwardly from the inner surface of the cylindrical socket and extending around the entire circumference thereof.

3 Claims, 4 Drawing Sheets

VENT PIPE COUPLING

CROSS-REFERENCE TO RELATED APPLICATION

This application is a file wrapper continuation of application Ser. No. 272,503, filed Nov. 16 1988, now abandoned.

BACKGROUND OF THE INVENTION

1. Field of the Invention

The invention relates to a single-piece vent or drain pipe coupling of the type which has a flexible bellows-type central portion.

2. Description of the Prior Art

Vent or drain pipes having a bellows-like center section are disclosed in German Patent DE-PS 29 29 978. Such vent or drain couplings offer the advantage that they can be deformed in a manner to go around obstacles in the roof support framework that cannot be moved or eliminated for many reasons. These couplings can also be used if the conduits that have to be connected with the hose are displaced axially. Installations with highly limited space availability usually require the simplest possible connector design between the parts to be joined. Also, a good seal is required between the parts joined which seal must be capable of functioning over very long service periods. For this purpose, the above-mentioned known coupling uses a separate rubber seal ring between a connection end attached to the roof vent, and a pipe receiving end for retaining the end of the connection pipe.

The receiving end of the flexible pipe coupling has an internal annular groove for accommodating the rubber seal ring. These sealing measures do not always function in an entirely reliable manner. Mainly if they are installed dry or with unfavorable tolerances on mating parts, the leading edge of the short connection pipe in the roof vent may push the seal ring out of its groove during insertion. Furthermore, the installer may forget to install a seal ring. This results in a potential hazard when making the connection between the short roof vent connection pipe and the receiving end of the flexible coupling which is not immediately noticeable because the seal cannot be seen. If the seal ring is not present the interconnection gradually becomes detached so that the problem may not be noticed for a long time with the result that the waste water or gases are not properly discharged. In addition, rain and condensation will readily enter the area of the roof framework. Since the seal ring is a separate part, it is particularly annoying if the seal ring slips from the installers hand such that the seal ring drops from the roof onto lower floors of the building resulting in a troublesome search.

SUMMARY OF THE INVENTION

It is an object of the invention to provide a one-piece flexible plastic vent or drain pipe coupling for connecting fixed pipes within a building.

It is yet another object of the invention to provide a one-piece flexible plastic coupling which has the ability to form a sealed joint around or within a pipe without the need for additional sealing elements.

It is yet a further object of the invention to provide a one-piece flexible plastic vent coupling which is simple in design, economical to manufacture and which is extremely simple to install around existing vents, drains or pipes.

Accordingly, these and related objects are achieved by a one-piece flexible plastic coupling for connecting a first conduit with a pipe of a second conduit. The flexible plastic coupling has a central portion in the form of a bellows which permits elongation, contraction and bending of the flexible coupling. The flexible coupling has at least one end adapted to receive an end of a pipe in a manner in which the coupling is sealed around the pipe. In order to receive the pipe, the flexible coupling has a cylindrical socket at at least one end which socket has an inner surface with a diameter greater than the outer surface of the pipe to which it is connected. The cylindrical socket also has an outer surface with a diameter defining a wall of predetermined thickness. The inner surface of the cylindrical socket has at least one resiliently deformable protrusion extending inwardly therefrom and extending around the circumference thereof. The other end of the coupling may be in the form of a plug for insertion inside a pipe to be connected.

The protrusion on the inside of the socket wall is formed by inwardly deforming the wall thereby forming a groove having a concave outer surface and a convex inner surface extending around the circumference of the socket. The convex surface formed by making the groove extends inwardly a predetermined distance. The concave portion of the groove is adapted to receive a generally circular clamping ring made of spring steel. The ends of the spring steel clamping ring overlap one another with respect to the outer circumference of the socket end of the vent pipe coupling. Each end has a handle formed by bending the end of the spring steel radially outwardly with respect to the central axis through the cylindrical socket.

In a second embodiment the protrusion formed on the inside wall of the socket is made by folding or bending the wall of the free end of the socket inwardly during formation of the coupling. The inwardly folded wall extends at a predetermined angle with respect to the central axis through the socket towards the bellows-like central portion to form a funnel shape which has its narrow end adjacent to the bellows-like central portion which narrow end is capable of radial expansion into an open space between, the wall folded inwardly from the free end of the socket and the remainder of the receptacle wall.

A highly useful flexible coupling is obtained as a result of such an embodiment: the flexibility of the coupling, which is initially present is exploited for forming an elastic seal thereon, which is in the form of a sealing and holding protrusion on an inner diameter of the coupling end. This makes special gaskets and preparations for the installation of such gaskets unnecessary, and the assembly of the coupling to a vent pipe and the connection so obtained is simple and foolproof. Generally, it suffices to form a holding protrusion that extends into the interior of the socket which is placed over the connecting pipe on the vent end of the coupling. The protrusion consists of the same material as the socket end and the connecting pipe. In addition to a perfect seal, the desired attachment of the two pipes can be achieved in this way. This coupling results from the resilient force developed by the initial deformation of the material section forming the protrusion upon insertion of the connecting pipe.

It has been found advantageous, furthermore, for the protrusion to be formed by an inwardly deformed or folded zone of the wall of the socket on the coupling. This deformation is such that a groove extends all around the outer surface of the socket. This has the advantage that the deforming forces also act on the cylindrical sections of the wall adjacent the deformation or groove which means that the elastic return force or resilient force is enlarged. Furthermore, the concave outer surface of the groove disposed around the outside of the socket end can be utilized for holding a clamping ring inserted in the groove. This feature represents an additional important feature of the present invention.

A clamping ring of the indicated design provides an additional support function for joining pipes, especially in larger-sized ventilation systems. Such a clamping ring, furthermore, increases the clamping effect and, at the same time, promotes the sealing effect. Furthermore, it was found to be beneficial if the clamping ring is made from spring steel wire, with the ends thereof overlapping one another across a circumferential section. The ends of the clamping ring have handles pointing approximately radially outwardly. For opening the clamping ring the ends only need to be pressed against or moved toward one another. Furthermore, for obtaining a perfect joint it has been found advantageous for the inner surface of the protrusion to have a convex curvature in cross section. This creates an alignment surface with a centering effect as well as a force-distributing effect. Such an embodiment is optimized further if the curvature has a spherical form (i.e., a segment of a sphere).

These and other objects and advantages of the present invention will become apparent from the following description of the accompanying drawings, which disclose several embodiments of the invention. It is to be understood that the drawings are to be used for purposes of illustrations only, and not as a definition of the invention.

BRIEF DESCRIPTION OF THE DRAWINGS

Further advantages and details can be gleaned from the drawings wherein similar reference numerals denote similar elements throughout the several views.

DESCRIPTION OF THE PREFERRED EMBODIMENTS

Figure 1:
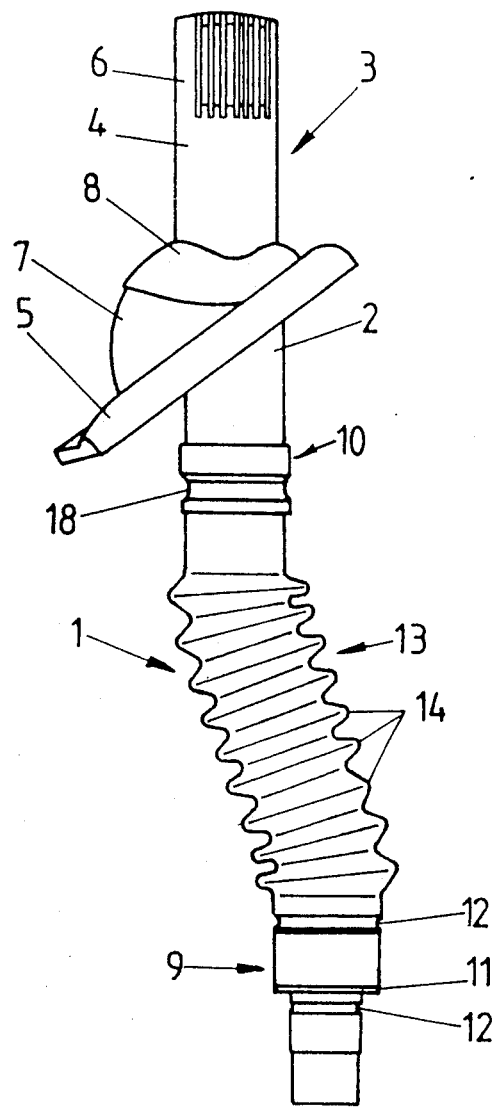
FIG. 1 is a flexible pipe coupling according to the invention with a socket end connected to a short connection pipe of a roof vent pipe.
Figure 2:
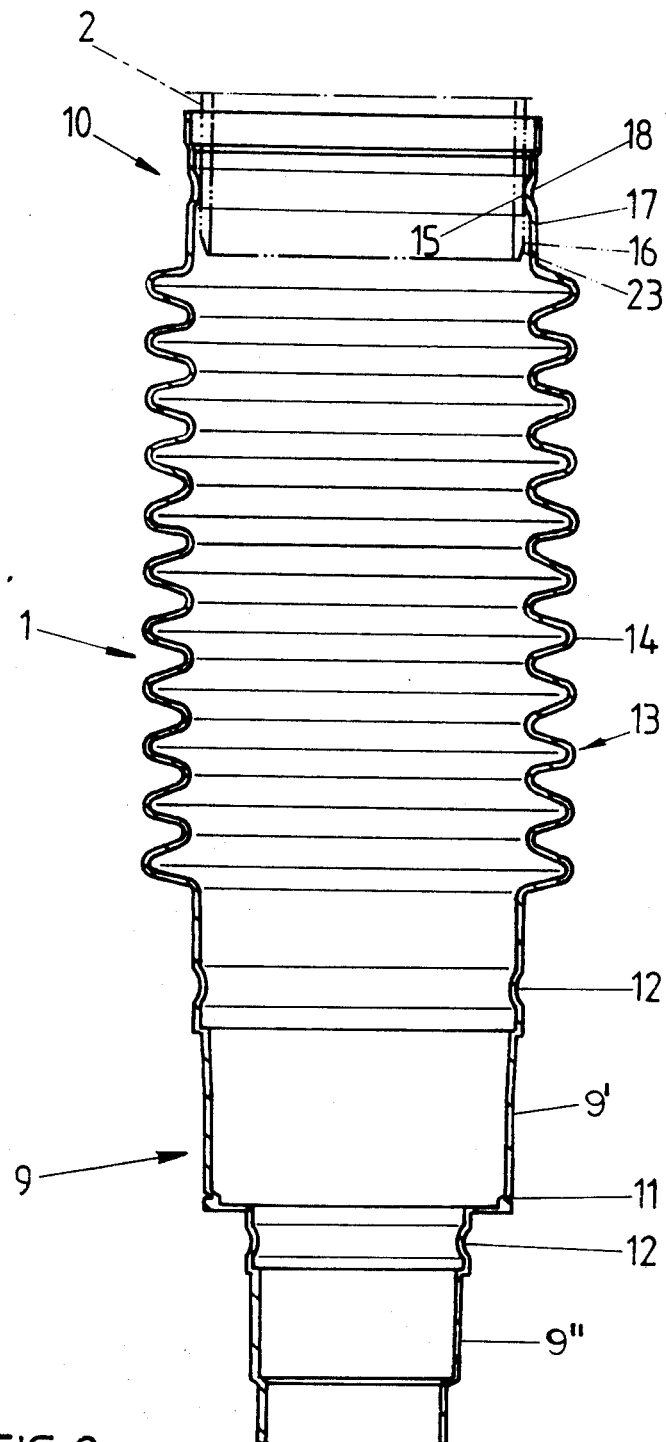
FIG. 2 is a vertical cross-sectional view through the flexible coupling of FIG. 1.

Referring to FIGS. 1-5 there is shown a flexible coupling 1 for coupling vent and drain pipes. Coupling 1 is made from plastic material, in particular from flexible PVC Coupling 1 typically serves for connecting a vent pipe or waste water drain pipe (which are not shown in the drawing) with a short connection pipe 2 of a roof vent 3. Roof vent 3 has a roof vent pipe 4 which extends above a roof plate 5 mounted on the building ,roof and through which such pipe 4 extends. Vent pipe 4 has a hood 6 at the upper end thereof, the latter being designed to protect against rain. For achieving an angular adjustment of the inclination relative to the plane of the plate 5, the hood forms a dome 7 above the roof cover plate 5. Dome 7 supports a cap having a corresponding guide surface on its inner side which can slide over the outer surface of dome 7. In this way, vent pipe 4 can be adjusted within a 20 to 40 degree range of adjustment depending on the gradient or inclination of the roof so as to be in the vertical position. The fastening means between cap 8 and dome 7 for effecting the vertical positioning of roof vent pipe 4 is not shown in the figures.

The lower end of coupling 1 is in the form of a short, stepped plug section 9, sized for insertion into a vent or drain conduit within the building and the other end, usually facing the roof, is in the form of a socket 10 of limited depth for receiving short connection pipe 2 of roof vent 3.

Stepped plug 9 has a first larger diameter 9' and a second smaller diameter 9''. If the smaller diameter section 9'' of the plug is not needed, it can be cut off depending on the size of the pipe in the building into which plug 9 is inserted. Notch 11 denotes the nominal point for such a separation. Notch 11 is an annular, notch with an angle of about 30 degrees, the lower flank being disposed perpendicular relative to the longitudinal center axis x—x of coupling 1. The outer surface of each pipe end section 9', 9'' is provided with an annular groove 12 for receiving a gasket (not shown).

The section between the plug 9 and the end of coupling 1 with socket 10 is made in the form of a folded bellows section 13. This bellows-like center part 13 is an integral component of flexible coupling 1 and is thus produced as one single piece with the coupling plug and socket ending, for example by the blowing process. The row of folds 14 extends approximately between plug end 9 and socket end 10. Normally, the inner diameter of bellows section 13 has a larger diameter than the end of section 9. The folds 14 as shown are shaped annularly, but of course a helical fold structure may also be used.

The socket end section 10 of coupling 1 includes a ring-shaped protrusion 15 extending into the interior of the socket. Protrusion 15 rests against the corresponding outer surface 16 of short connection pipe 2, thus forming a seal therebetween. This seal is produced both by the elasticity of the material of socket 10 and the flexibility of protrusion 15. This design results in a perfect coupling between short connection pipe 2 after insertion into socket 10 of coupling 1 which joint is durable over an extremely long period of time.

Figures 3, 4:
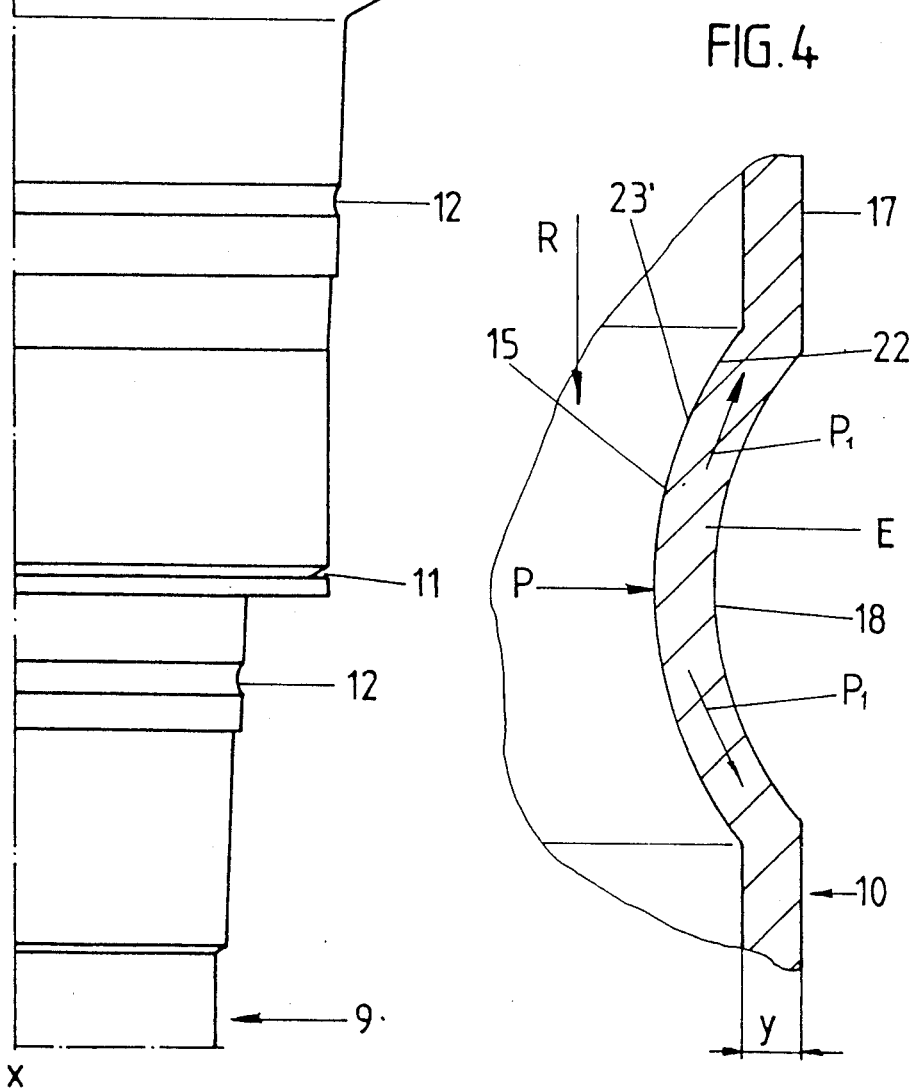
FIG. 3 is a partial side view of the flexible coupling of FIG. 1, showing the end thereof with the bellows-like center part being removed for clarity.
FIG. 4 is an enlarged view of the sealing and holding protrusion shown in FIG. 2.

FIG. 4 shows protrusion 15 formed by an inwardly deformed zone E of the wall of socket 10. This deformation is done in a way such that an annular groove 18 is formed which extends all the way around the outer surface 17 of the socket end 10 of coupling 1. Thus the wall of socket 10 extends across zone E on which annular groove 18 is formed with practically the same wall thickness "y". When connection pipe 2 is inserted into socket 10, the load or stress acts in the direction P of FIG. 4, such stress being caused by the axial pressure developed during the insertion of connection pipe 2. This outward pressure is caused because the outer diameter of connecting pipe 2 is larger than the inner diameter of protrusion 15. The convex wall section of protrusion 15 offers good resistance to deformation even if the plastic material is made rather soft, the force components P1 being transmitted into or being absorbed by the cylindrical sections of the wall of socket 10 adjacent protrusion 15.

To facilitate the connection with connection pipe 2, protrusion 15 has a cross section with an inwardly facing convex curvature. In this way a ramp surface 23' is formed acting to center connecting pipe 2 upon insertion (i.e., in direction R of FIG. 4). This curvature, extends all around the inner diameter of receptacle 10 with rotational symmetry and is generally spherical. A bevelled outer edge 23 is provided on connection pipe 2 (see FIG. 2) in order to assure smooth sliding during insertion of connection pipe 2 into receptacle 10.

Figure 5:
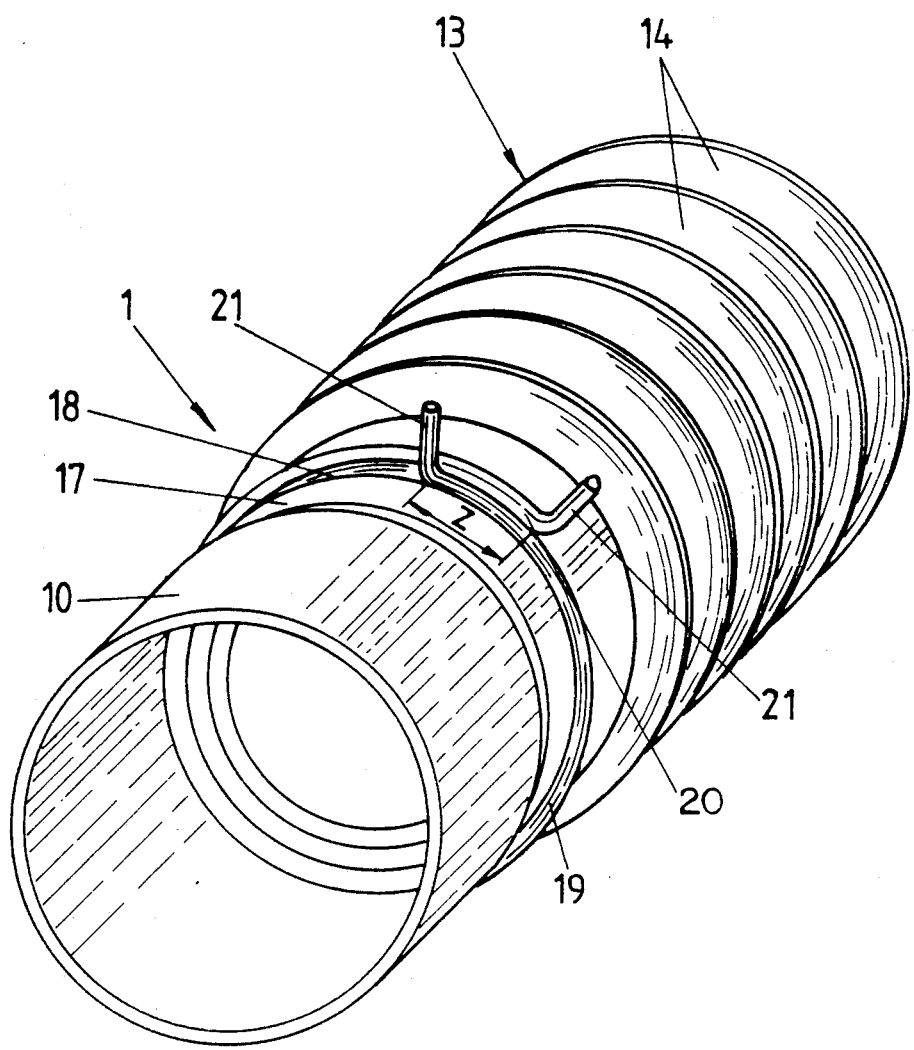
FIG. 5 is a isometric view of the end of the flexible coupling on the side having the socket end being shown with the associated clamping ring.

FIG. 5 shows that outer annular groove 18 may be used for receiving a clamping ring 19. Ring 19 consists of a spring steel wire which is prestressed to a predetermined degree to produce the required clamping force. The ends of ring 19 overlap a length "z" to allow for inserting or detaching clamping ring 19. The end zones 20, which are formed by the overlap, and which extend in opposing directions, form handles 21. Handles 21 are directed radially outwardly and are formed by the ends of the spring steel wire making up ring 19.

While several embodiments and examples of the present invention have been illustrated and described it is obvious that many changes and modifications may be made thereunto, without departing from the spirit and scope of the invention.

What is claimed is:

1. A one-piece flexible vent pipe coupling having a single-ply wall comprised of an elastic plastic material of substantially uniform thickness, the wall comprising a cylindrical socket end receiving a first short connection pipe section of a roof vent inserted into the socket end, another cylindrical end connected to a second pipe section of the roof vent and a central compressible bellows portion between the ends, the central bellows portion being comprised of a series of folds including an inwardly projecting end fold adjacent the socket end, the folds of the bellows portion in the relaxed condition thereof defining an inner diameter of the bellows portion which is substantially equal to the outer diameter of the short connection pipe section, the inwardly projecting end fold of the central bellows portion being constricted under compression upon insertion of the short connection pipe section of the roof vent into the socket end and the constricted end fold forming an abutment for the inserted connection pipe section, the elastic plastic material of the cylindrical wall of the socket end of the vent pipe coupling being deformed by depressing the wall material to form an inwardly directed circumferential arcuate protrusion pressing against, and sealingly retaining, the inserted first short connection pipe section, the depression of the wall material forming a circumferentially extending annular groove.

2. The one-piece flexible pipe coupling of claim 1, wherein the protrusion has a convexly curved cross section.

3. The one-piece flexible pipe coupling of claim 2, wherein the convex curvature is spherical.

* * * * *